United States Patent [19]

Nixon et al.

[11] Patent Number: 5,152,504

[45] Date of Patent: Oct. 6, 1992

[54] VACUUM VALVE

[75] Inventors: Terence W. Nixon, Tewksbury; William R. Shields, Chelmsford, both of Mass.

[73] Assignee: Janis Research Company, Inc., Wilmington, Mass.

[21] Appl. No.: 757,820

[22] Filed: Sep. 11, 1991

[51] Int. Cl.$^5$ .................. F16K 1/48; F16K 1/02
[52] U.S. Cl. .................. 251/332; 251/334; 251/357; 251/900
[58] Field of Search .............. 251/900, 334, 333, 332, 251/357

[56] References Cited

U.S. PATENT DOCUMENTS

| | | |
|---|---|---|
| Re. 7,048 | 4/1876 | Frink . |
| 75,670 | 3/1868 | Douglas . |
| 82,844 | 10/1868 | Jenkins . |
| 1,800,127 | 4/1931 | Wilson . |
| 2,457,492 | 12/1948 | Raybould . |
| 4,190,073 | 2/1980 | Claycomb . |
| 4,249,717 | 2/1981 | Thompson . |
| 4,474,358 | 10/1984 | Bennett .................. 251/900 X |
| 4,477,053 | 10/1984 | Jandrasi .................. 251/334 X |
| 4,688,757 | 8/1987 | Cook et al. . |
| 4,848,729 | 7/1989 | Danzy .................. 251/332 |

*Primary Examiner*—Arnold Rosenthal

[57] ABSTRACT

A vacuum valve that forms a tight vacuum seal is disclosed. The valve incorporates a hollow, malleable, metallic O-ring that deforms and conforms readily under pressure to seal the space between a movable valve member and a valve seat. When the valve is closed, the O-ring is compressed between opposed machined surfaces of the valve member and the valve seat, readily deforming and conforming to those surfaces, thus creating a vacuum-tight seal thereat.

10 Claims, 1 Drawing Sheet

VACUUM VALVE

FIELD OF THE INVENTION

This invention relates generally to a vacuum valve incorporating a hollow, malleable, metallic O-ring that deforms and conforms readily under pressure to fill the space between a valve movable member and a valve seat, creating a seal that will not leak under an ultrahigh vacuum.

BACKGROUND OF THE INVENTION

Cryogenic liquids may be stored and transported in double-walled Dewar containers having a vacuum between the two walls for insulation purposes. To draw that vacuum, a manually operated valve fitting may be provided in the outer wall of the container for connection to a vacuum pump. With the valve open, the space is evacuated, following which the valve is closed to maintain the vacuum. In any valve system for such containers or for any gas pathway maintained under high vacuum, it is crucial that the seal between the movable valve member and its seat be tight to prevent leakage and contamination of the evacuated space.

Producing a reliable vacuum valve is difficult. Even the slightest defect in manufacturing may result in leakage at the valve seat. Additionally, the valve seat of even a perfectly manufactured valve can become worn, scratched or contaminated, thereby compromising the integrity of the valve seal. To solve these problems, some prior vacuum valves have a layer of material, in particular an O-ring made of organic material, between the valve member and the valve seat. However, organic O-rings outgas at low pressures, thereby introducing contaminants into the gas pathway. Moreover, organic O-rings become permeable over time and lose their sealing effectiveness. Thus, organic O-rings may not provide a reliably tight seal for containers or any gas pathway maintained under a high vacuum and may cause contamination. Although hollow, metal O-rings exist, they have not been used in the context of vacuum valves, i.e. as seals maintained under a high vacuum.

SUMMARY OF THE INVENTION

It is among the objects of this invention to provide an improved vacuum valve.

Another object of the invention is to provide a vacuum valve whose vacuum seal will not outgas in a high vacuum environment.

Another object of the invention is to provide a vacuum valve that maintains a tight seal under ultra high vacuum conditions.

Briefly, a vacuum valve embodying the invention incorporates a tubular valve housing having an inlet and an outlet and a valve seat in between the inlet and outlet. Movably mounted within the housing is a valve seal assembly disposed to seat on the valve seat. The seal assembly includes a valve member having an end facing the valve seat, a hollow, malleable, metallic O-ring and a mounting subassembly for mounting the O-ring to that end of the valve member. When the valve seal assembly is seated against the valve seat, the O-ring is compressed between opposing surfaces of the mounting subassembly and seat. Resultantly, the O-ring deforms and conforms to the contours of those opposing surfaces, forming a vacuum seal between those surfaces.

In this connection, the described hollow, malleable, metallic O-ring conforms more readily and more closely to the surfaces defining the gap to be sealed than does a solid metallic O-ring of the type used in conventional valves. Additionally, the actuation force required to completely close a valve having a hollow, malleable, metallic O-ring is less than the force required to close a valve having solid metal O-ring. Moreover, this hollow metallic O-ring, unlike an organic O-ring, will not outgas in a high vacuum environment.

BRIEF DESCRIPTION OF THE DRAWING

The above and further advantages of the invention may be better understood by referring to the following description in conjunction with the accompanying drawing, in which.

DETAILED DESCRIPTION OF ILLUSTRATIVE EMBODIMENT

Figure 1:
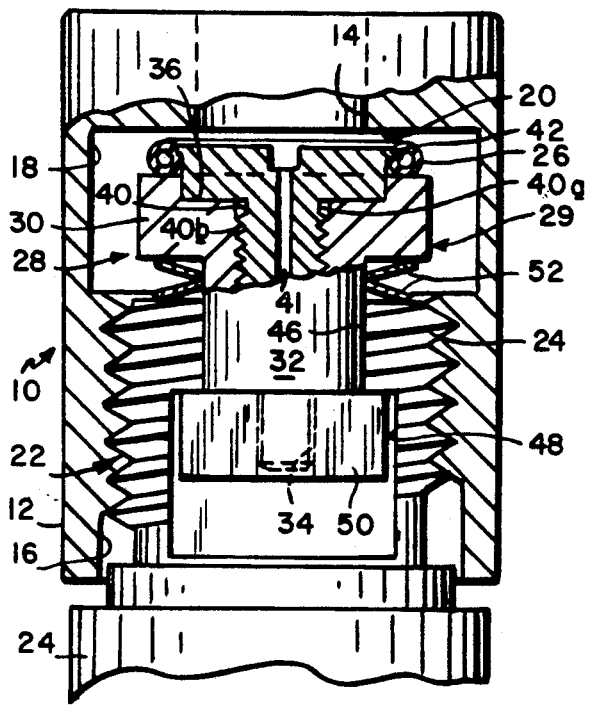
FIG. 1 is a sectional view with some parts shown in elevation of a valve incorporating the invention and showing the valve in its open position.
Figure 2:
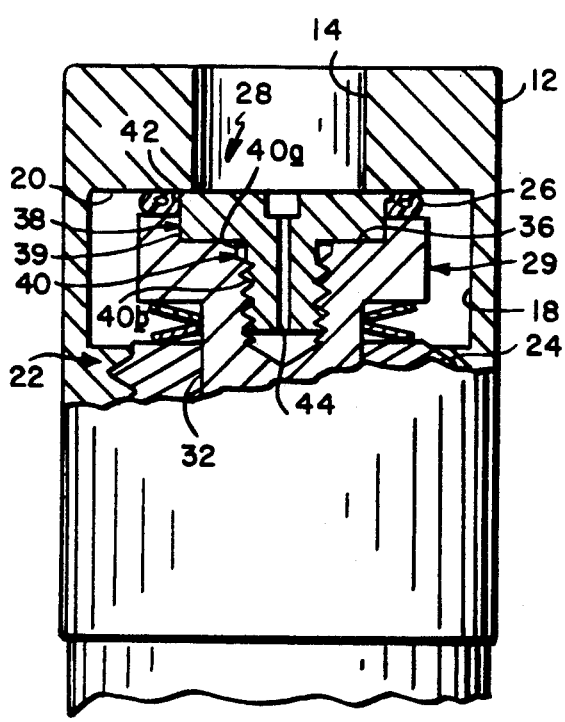
FIG. 2 is an elevational view with parts broken away illustrating the valve in its closed position.
Figure 3:
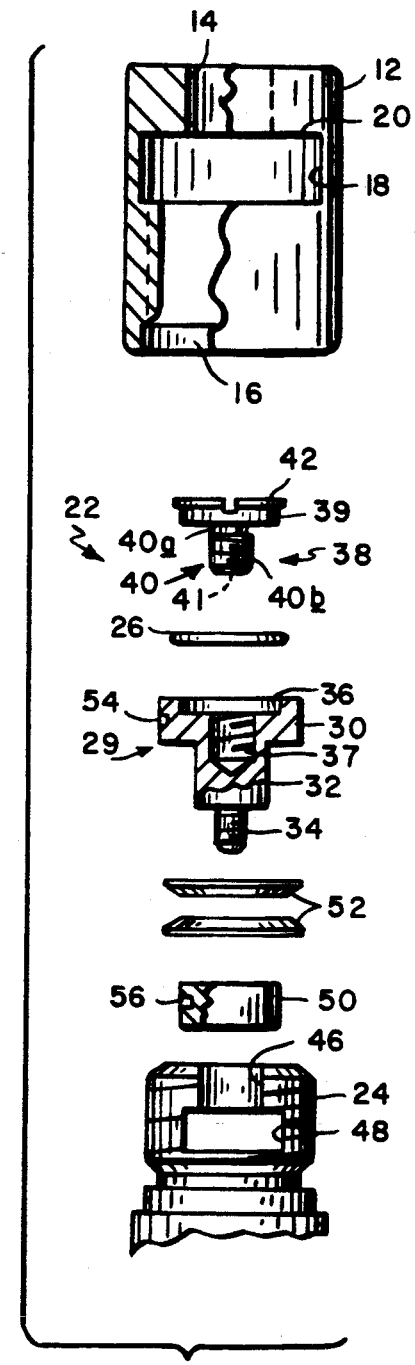
FIG. 3 is an exploded elevational view with parts broken away showing the elements of the FIGS. 1 and 2 valve in greater detail.

Referring to FIGS. 1 to 3 of the drawings, my valve, shown generally at 10, comprises a tubular valve housing 12 with an inlet passage 14 and a larger diameter outlet passage 16 whose wall is threaded. Positioned between the inlet and outlet passages is a cylindrical chamber 18 one wall of which defines a valve seat 20.

Movably mounted within housing 12 is a valve seal assembly 22 which is arranged to seat on seat 20 to isolate the valve inlet and outlet passages. Assembly 22 includes a valve member 24 threadedly engaged to the outlet passage wall 16 so that when that member is rotated in one direction or the other, it moves axially in the housing 12 toward or away from the valve seat 20. The exterior (i.e. herein lower) end of valve member 24 may be keyed to the end of a valve operator (not shown) so that it can be turned easily more or less like the stem of a faucet.

Seal assembly 22 also includes a hollow, malleable metallic O-ring 26 and a mounting subassembly 28 for mounting same to the inner end of valve member 24. In the illustrated valve, mounting subassembly 28 includes a threaded fastener 29 having a discoid head 30, a smaller diameter neck 32 and a threaded shank 34. The head end of the fastener is provided with a circular recess 36 and a threaded axial passage 37 for receiving an O-ring retainer screw 38. Retainer screw 38 includes a discoid head 39 connected to a smaller diameter shank or stem 40. The shank 40 is stepped to include a neck segment 40a and an increased-diameter end segment 40b which is threaded to cooperate with threaded axial passage 37. Preferably, retainer screw 38 is provided with an axial passage 41 to vent the space at the end of passage 37.

When shank 40 is fully screwed into axial passage 37, the discoid head 39 snugly seats in the circular recess 36 so that about one-half the thickness of the discoid head 39 projects out of the recess. As best seen in FIGS. 1 and 3, the periphery of the discoid head 39 is stepped to form a lip 42 which is slightly larger in diameter than the inner diameter of O-ring 26.

Thus, O-ring 26 can be engaged around the discoid head 39 from the smaller diameter end thereof and will be retained there by the lip 42 when the retainer is seated in recess 36 as best seen in FIG. 1. Yet, the undeformed O-ring still projects somewhat beyond the discoid head 39 as shown there.

As best seen in FIG. 1, the mounting subassembly 28 carrying O-ring 26 is mounted to the inner end of the movable valve member 24. To facilitate easy replacement of that subassembly, a longitudinal slot 46 may be formed in the side of the inner end segment of valve member 24. Also, a larger lateral opening 48 may be present in the side wall of the valve member at the end of slot 46. Slot 46 should be slightly larger in diameter than the neck 32 of fastener 29 so that the fastener neck can be received in the slot as shown in FIG. 1 and aligned axially with valve member 24. The fastener is releasably held in place there by a nut 50 which is small enough to fit through opening 48, but wider than the slot 46, and is arranged to thread onto the shank 34 of fastener 29.

Preferably one or more Belville washers 52 are provided around fastener neck 32 so that when nut 50 is tightened on shank 34, each washer will exert an axial thrust on the fastener so that frictional forces will prevent the nut from loosening. If desired, small recesses 54 and 56 may be provided in the sides of the fastener head 30 and nut 50, respectively, which can be engaged by a suitable sharp tool (not shown) to facilitate turning the nut relative to the fastener to tighten and loosen the connection between subassembly 28 and the valve member 24.

As noted previously, the O-ring 26 is hollow, metallic and malleable. Preferably, it is made of stainless steel and it may be overplated with an inert metal such as silver. The remaining major components of the valve may be made of brass or the like metal.

In use, valve 10 may be connected so that its inlet passage 14 leads from a line or container that is to be evacuated. The valve outlet 16 may be connected by a suitable vacuum coupling to a vacuum pump. With valve seal assembly 22 in its open position shown in FIG. 1, air may be drawn out through the valve. When the pumping process is completed, the operator may turn valve member 24, e.g. clockwise, to cause seal assembly 22 to move axially within housing 12 to its closed position shown in FIG. 2.

As O-ring 26 is squeezed between valve seat 20 and the end of fastener head 30, it deforms and conforms to those opposing machined surfaces so that a vacuum-tight seal is created there. In this connection, the protruding edge margin of the retainer discoid head 39 within the O-ring confines the O-ring to the gap between the valve seat 20 and the head 30 so that a very strong outer seal is present at the boundary between the valve seat and the retainer.

Also, since the O-ring is made of metal, no outgassing occurs from the O-ring which could contaminate the volume being sealed. Also, as noted above, due to the presence of the vent passage 41 in retainer screw 38, there are no trapped gases in the fastener 29 that could present a contamination problem.

Valve 10 may be opened by rotating valve member 24 in the opposite direction thereby moving O-ring 26 away from the valve seat 20.

Since the O-ring 26 can be used only once, the entire valve seal assembly 22 must be removed from housing 12 and the flattened O-ring replaced before the valve is to be closed again. This can be accomplished quite quickly by unscrewing the retainer screw 38 and lifting the retainer screw, as well as the old O-ring 26 encircling it, from recess 36. A new O-ring 26 is then placed around the retainer discoid head 39 and the retainer screw 38 is inserted into recess 36 and screwed into axial passage 37. After the retainer screw 38 is tightened, the valve seal assembly is inserted into housing 12.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A valve comprising:
   a housing having an inlet and an outlet;
   means defining a valve seat in the housing between the inlet and the outlet; and
   a valve seal assembly movable in the housing between an open position wherein the seal assembly is spaced from the valve seat allowing gas flow between the inlet and the outlet and a closed position wherein said assembly bears against said valve seat blocking said flow, said seal assembly including
   a valve member having inner and outer ends and being threadedly engaged to said housing so that when the valve member is rotated in one direction or the other, the seal assembly is moved toward its open or closed position;
   a hollow malleable metallic O-ring, and
   means for releasably mounting said O-ring to the inner end of said valve member opposite the valve seat so that when the valve member is rotated to move the seal assembly to its closed position, the O-ring is compressively deformed between the valve seat and the mounting means creating a vacuum-tight seal between said inlet and said outlet.

2. The valve defined in claim 1 wherein the mounting means comprise:
   fastener means having one end which is at least as large as the O-ring;
   an opposite end connected to the valve member; and
   means for releasably retaining said O-ring flush against said fastening means one end.

3. The valve defined in claim 2 wherein said retaining means comprise:
   a retainer member which engages the radially inner wall of the O-ring, and
   means for releasably securing the retainer member to the fastening means one end.

4. The valve defined in claim 3 wherein
   the retainer member comprises a screwhead having two circular edges one of which is spaced away from said fastening means one end, said screwhead having a peripheral lip at said one circular edge whose diameter is slightly larger than the inner diameter of the O-ring so that the lip slightly overlies the O-ring, and
   the securing means is a screw shank extending from said screwhead and threaded into said fastening means one end.

5. The valve defined in claim 4 wherein the thickness of the screwhead is greater than that of the O-ring and the screwhead is partially recessed into said fastening means one end.

6. The valve defined in claim 4 wherein the screwhead and shank have an axial vent passage extending through them.

7. The valve defined in claim 3 wherein said connection between said fastener means opposite end and said valve member comprises:
- a threaded shank at the opposite end of the fastening means
- a lengthwise slot in the side wall of said valve member and extending to the inner end of the valve member, said slot being sized to receive said fastening means so that said one end of the fastening means projects from the inner end of the valve member;
- a ledge formed in said slot a selected distance from the inner end of the valve member; and
- a nut received in said slot and threaded onto said shank so that when the nut is tightened on the shank, the nut is clamped against said ledge thereby retaining the fastening means in said slot.

8. In a vacuum valve of the type having a housing defining an inlet, an outlet and a valve seat therebetween, a valve member movable within the housing between valve open and valve closed positions and an O-ring releasably mounted to the valve member and for engaging the valve seat when the valve member is in its valve closed position, the improvement wherein the O-ring is of a malleable metal and is hollow and is generally O-shaped in cross-section so as to define a fluid-tight annular enclosure.

9. The valve defined in claim 8 wherein the O-ring is of stainless steel.

10. A valve comprising:
- a housing having an inlet and an outlet;
- means defining a valve seat in the housing between the inlet and the outlet; and
- a valve seal assembly movable in the housing between an open position wherein the seal assembly is spaced from the valve seat allowing gas flow between the inlet and the outlet and a closed position wherein said seal assembly bears against said valve seat blocking said flow, said seal assembly including
- a valve member having inner and outer ends and being threadedly engaged to said housing so that when the valve member is rotated in one direction or the other, the seal assembly is moved toward its open or closed position;
- a hollow malleable metallic O-ring of silver-plated stainless steel, and
- means for mounting said O-ring to the inner end of said valve member opposite the valve seat so that when the valve member is rotated to move the seal assembly to its closed position, the O-ring is compressively deformed between the valve seat and the mounting means creating a vacuum-tight seal between said inlet and said outlet.

* * * * *